United States Patent [19]

McConnell

[11] 4,161,185
[45] Jul. 17, 1979

[54] ALIGNMENT CONTROL APPARATUS FOR A SELF-PROPELLED IRRIGATION SYSTEM

[75] Inventor: James R. McConnell, Colorado Springs, Colo.

[73] Assignee: Tumac Industries, Inc., Colorado Springs, Colo.

[21] Appl. No.: 905,277

[22] Filed: May 12, 1978

[51] Int. Cl.² ............................................. B05B 3/12
[52] U.S. Cl. .................................... 137/344; 239/177
[58] Field of Search ................ 137/344; 239/177, 212, 239/213

[56] References Cited

U.S. PATENT DOCUMENTS

| | | | |
|---|---|---|---|
| 2,628,863 | 2/1953 | Maggart | 239/212 X |
| 2,893,643 | 7/1959 | Gordon | 239/177 |
| 3,314,608 | 4/1967 | Curtis et al. | 239/177 |
| 3,342,417 | 9/1967 | Dowd | 239/177 |
| 3,352,493 | 11/1967 | Curtis | 239/177 |
| 3,353,750 | 11/1967 | Dowd | 239/177 |
| 3,353,751 | 11/1967 | Dowd | 239/177 |
| 3,386,661 | 6/1968 | Olson et al. | 239/177 |
| 3,394,729 | 7/1968 | Bower et al. | 137/344 |
| 3,556,406 | 1/1971 | Harris | 239/177 |
| 3,599,664 | 8/1971 | Hotchkiss et al. | 137/344 |
| 3,608,826 | 9/1971 | Reinke | 137/344 X |
| 3,720,374 | 3/1973 | Ross | 239/177 |
| 3,780,947 | 12/1973 | Ririe et al. | 137/344 X |
| 3,785,400 | 1/1974 | Zimmerer et al. | 137/334 |
| 3,797,517 | 3/1974 | Kircher et al. | 137/344 |
| 3,823,730 | 7/1974 | Sandstrom et al. | 137/344 |
| 3,831,692 | 8/1974 | Fry | 239/177 X |
| 4,073,309 | 2/1978 | Fraser et al. | 239/212 X |

*Primary Examiner*—Gerald A. Michalsky
*Attorney, Agent, or Firm*—Burton & Dorr

[57] ABSTRACT

An alignment control for a self-propelled irrigation system. The alignment control maintains adjacent pipe segments of the irrigation system in a predetermined alignment and includes an elongated actuation arm pivotally mounted near its center for movement about a substantially vertical axis. One end portion of the arm is spring biased against one of the pipe segments and the other end is operably connected to a control valve which runs one of the self-propelled support towers of the irrigation system. In the preferred embodiment, the end portion abutting the pipe segment is bifurcated into two legs which vertically straddle a section of the pipe segment. The spring means biases one of the legs toward an abutting relationship with the pipe section making the actuation arm very sensitive and responsive to misalignments of the adjacent pipe segments. The valve housing for the control valve is also mounted for pivotal movement and the second end portion of the actuation arm is adjustably connected to the valve control member so that the alignment control system of the present invention can be adjusted to maintain adjacent pipe segments at any desired relative angle to each other. The connecting means further includes means for quickly disengaging the actuation arm from the valve control member to avoid damage to the alignment control system should the irrigation system malfunction.

18 Claims, 8 Drawing Figures

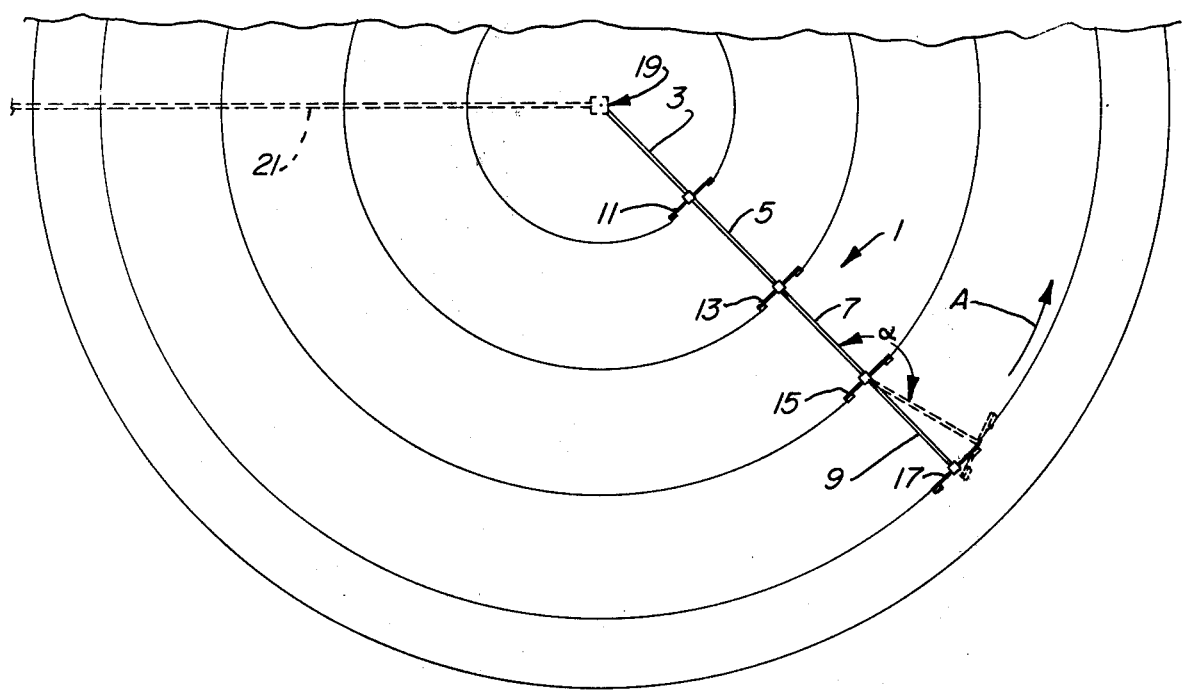
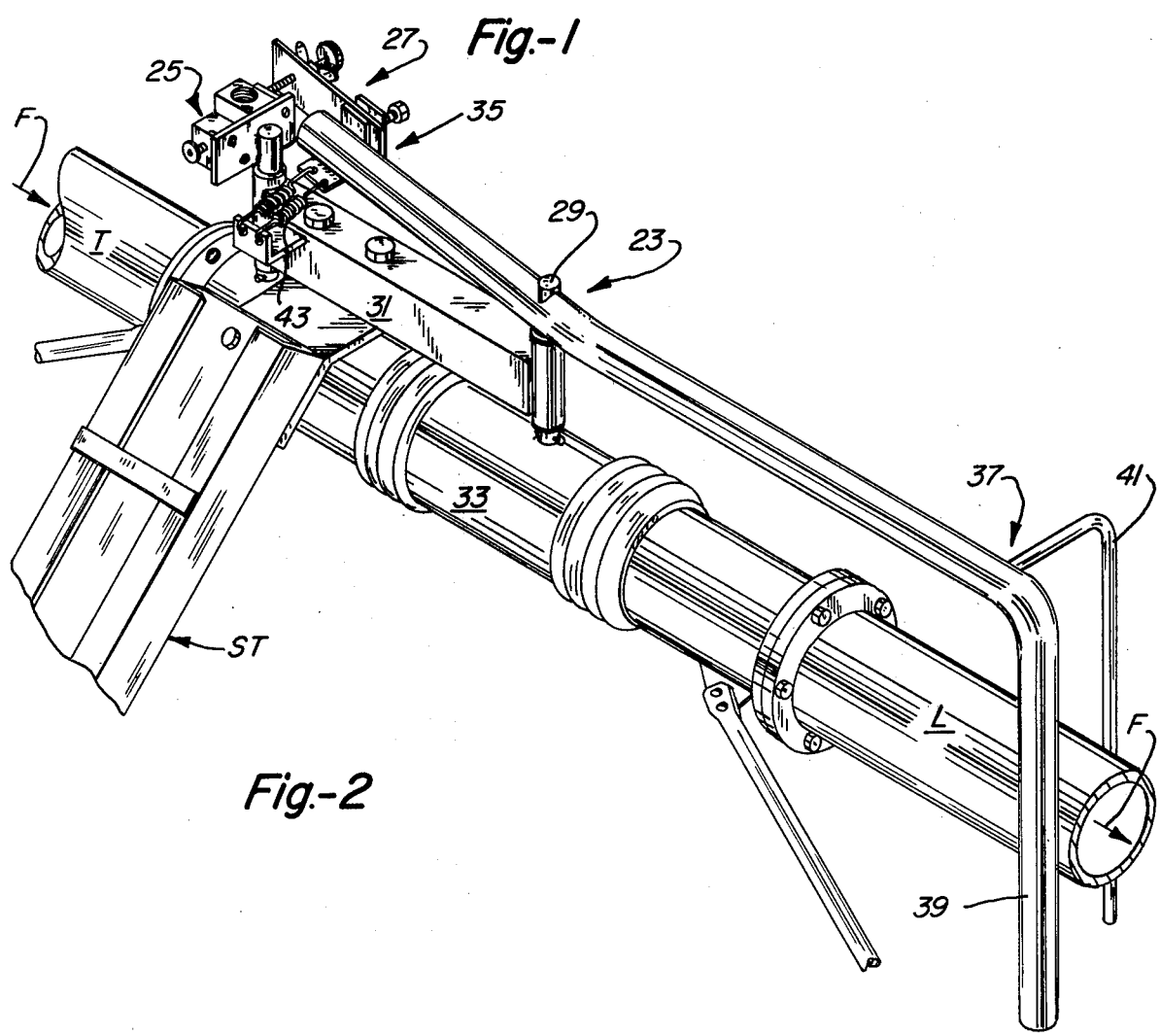

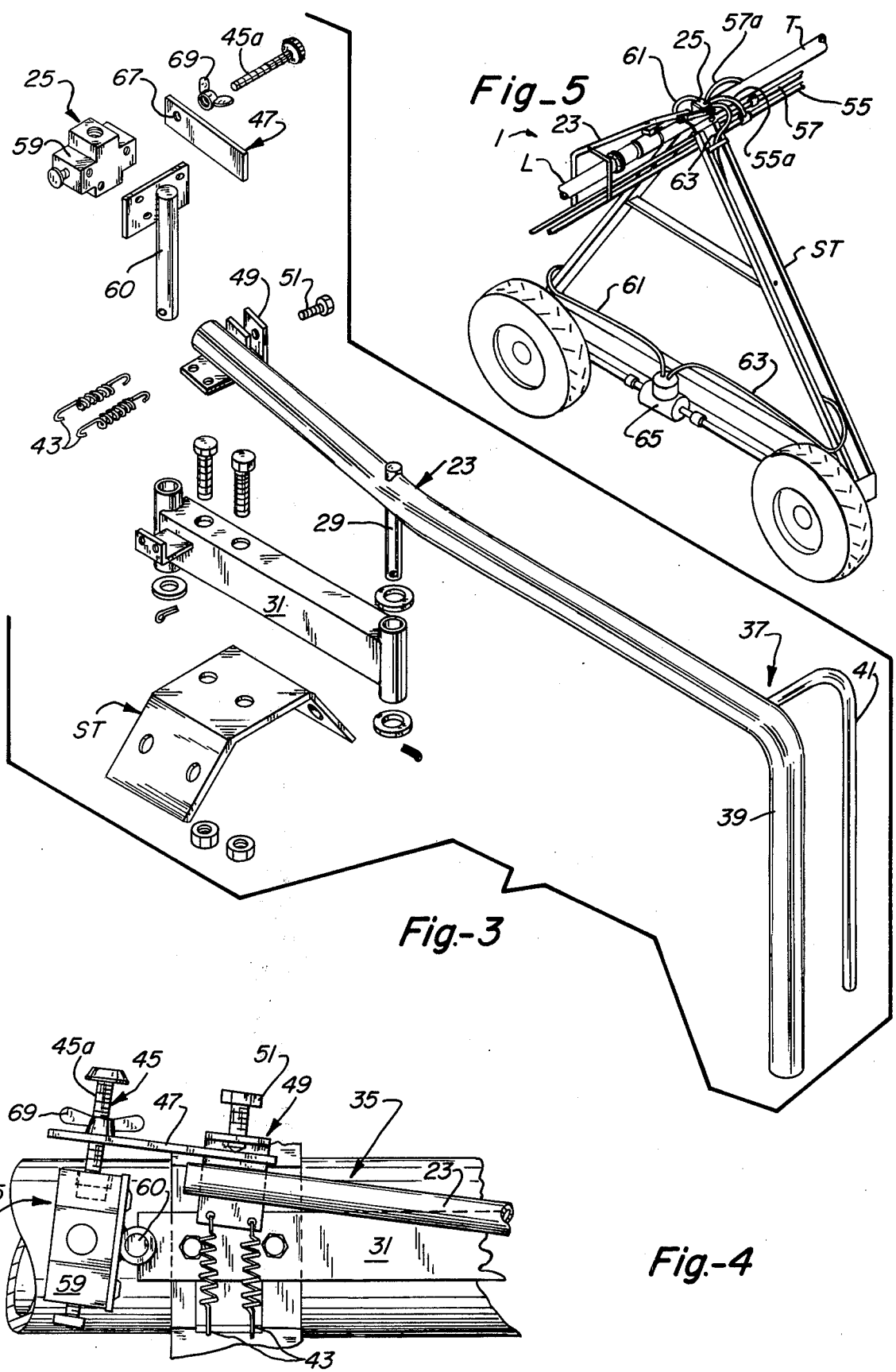

ALIGNMENT CONTROL APPARATUS FOR A SELF-PROPELLED IRRIGATION SYSTEM

BACKGROUND OF THE INVENTION

1. Field of the Invention

This invention relates to the field of alignment controls for self-propelled irrigation systems.

2. Description of the Prior Art

Self-propelled irrigation systems generally comprise an overhead, horizontal distribution pipe made up of a plurality of pipe segments each of which is supported by its own self-propelled tower. The towers have individual drive arrangements which are typically powered by hydraulic fluid or electricity. An essential part of any such self-propelled irrigation system is the alignment control which maintains the pipe segments of the distribution pipe in proper alignment as the irrigation system moves. Typically, an alignment control system comprises a plurality of units positioned at each joint between adjacent pipe segments. Each unit has a sensor for monitoring deflections in the alignment of the adjacent pipe segments and a control vlave operably connected to the sensor which changes the speed of the drive of the nearest tower to the joint in proportion to the sensed deflections. A common mode of operation in self-propelled irrigation systems is to set the drive of one of the pipe segment's tower at a predetermined set speed and have the remaining pipe segments move sequentially in a follow-the-leader, catch up fashion.

Numerous alignment control systems have been patented. Many of these systems use an arrangement of cables to detect deflections of the pipe segments away from a predetermined alignment. Examples of such systems are: U.S. Pat. Nos. 3,599,664 to Hotchkiss et al issued on Aug. 17, 1971 (see FIGS. 5 and 6), 3,394,729 to Bower et al issued on July 30, 1968 (see FIGS. 2 and 8), 3,780,947 to Ririe et al issued on Dec. 25, 1973, 3,352,493 to Curtis issued on Nov. 14, 1967, 3,608,826 to Reinke issued on Sept. 28, 1971 (see FIG. 10), 3,342,417 to Dowd issued on Sept. 19, 1967, 2,893,643 to Gordon issued on July 7, 1959, and 3,353,750 to Dowd issued on Nov. 21, 1967. Such cable systems have been found to have several drawbacks. Notably, the cables cannot be easily and quickly adjusted and any adjustments often require the retying of knots and the replacement of cables. Further, the cables can break, shrink, or stretch during use. Stretching and shrinking can often occur when the temperature and other weather conditions vary while the irrigation system is operating. Even slight stretching or shrinking of the cable or loosening of the cable knots as in a system like that of Hotchkiss (see his FIG. 5) can throw the entire system out of alignment. Also, should it be desireable to run the irrigation system with some pipes in a straight line and others at a considerable angle, cable systems such as Hotchkiss would require that several of the cables be replaced with longer ones and many of the knots retied.

Several alignment control systems use arms which are rigidly attached at one end to one pipe segment and operably attached at the other end to a control valve mounted on the adjacent pipe segment. Examples of these are: U.S. Pat. Nos. 2,628,863 to Maggart issued on Feb. 17, 1953 (see FIG. 6), 3,720,374 to Ross issued on Mar. 13, 1973 (see FIGS. 8-11), 3,386,661 to Olson et al issued on June 4, 1968 (see FIGS. 6-7), and 3,823,730 to Sandstrom et al issued on July 16, 1974 (see FIGS. 3-4). Such systems with rigidly attached arms are often difficult to adjust and difficult to quickly disconnect to avoid damage should the alignment control system malfunction and adjacent pipe segments be placed at a considerable angle to each other. Lever arms which are pivotally mounted near the center of the arm have also been used. In these systems, one end of the lever arm moves with one of the pipe segments and the other end of the lever arm is operably connected to the control valve mounted on the adjacent pipe segment. An example of such a system is U.S. Pat. No. 3,556,405 to Harris et al issued on Jan. 19, 1971 (see FIGS. 24-33).

Other alignment control systems include ones that suspend the pipe segment from a cable like a pendulum and monitor movements of the suspended pipe away from the vertical (U.S. Pat. Nos. 3,353,751 to Dowd issued on Nov. 21, 1967 and 3,314,608 to Curtis et al issued on Apr. 18, 1967). Still others use stress switches (U.S. Pat. No. 3,797,517 to Kircher et al issued Mar. 19, 1974), remotely operated electrical systems (U.S. Pat. No. 3,831,692 to Fry issued on Aug. 24, 1974) and electrical systems which include circuits for specifically pointing out the location of any malfunction (U.S. Pat. No. 3,785,400 to Zimmerer issued on Jan. 15, 1974).

The alignment control system of the present invention is designed to overcome many of the problems experienced in prior art systems. the alignment control system of the present invention is simple, strong, reliable, safe, sensitive to small deflections, and quickly responsive to misalignments. The invention also operates smoothly and can track forwardly and backwardly so that the irrigation system can operate on a reciprocating cycle. Further, the alignment control system of the present invention can be quickly disengaged to avoid damage to it upon a malfunction in the irrigation system and can be quickly and easily adjusted so that adjacent pipe segments can track at any desired relative angle.

SUMMARY OF THE INVENTION

The present invention involves an alignment control apparatus for a self-propelled irrigation system. The invention includes an elongated actuation arm which is pivotally mounted near its center to a first of two adjacent pipe segments for movement about a substantially vertical axis. In the preferred embodiment, one end portion of the arm is bifurcated into two legs which vertically straddle a section of the second pipe segment. The other end portion of the arm is operably connected to the control member of a spool valve which operates the drive of the support tower for the first pipe segment. The valve control member moves within a valve housing which is mounted for pivotal movement about a fixed axis relative to the first pipe segment. The valve control member has a neutral position within the valve housing in which the tower's drive is still. The connecting means between the actuation arm and the valve control member is adjustable along the control member to vary the position of the actuation arm relative to the neutral position of the control member. In this manner, the alignment control apparatus of the present invention can be set to maintain the adjacent pipe segments at any desired angle relative to each other.

The present alignment control system also includes means for biasing one leg of the bifurcated end portion of the actuation arm against the second pipe segment in an abutting relationship. This makes the system very sensitive to deflections of the pipe segments and very responsive to misalignments because the arm always moves with the second pipe segment without any play even when the irrigation system reverses its travel direction. A releasing means is also included in the connecting means between the actuation arm and the valve control member so that the two can be quickly and easily disengaged to avoid damage to the system should it malfunction. The releasing means can also be easily and quickly disengaged prior to towing of the irrigation system between locations to prevent damage to the alignment control apparatus.

OBJECTS OF THE INVENTION

It is an object of this invention to provide a novel alignment control for a self-propelled irrigation system.

It is an object of this invention to provide an alignment control system that is simple, strong, reliable, and safe.

Another object is to provide a novel alignment control system that is sensitive to small deflections between adjacent pipe segments.

Another object is to provide a novel alignment control system that is quickly responsive to misalignments.

It is an object of this invention to provide a novel alignment system that operates smoothly.

Another object is to provide a novel alignment control system that can track forwardly and backwardly so that the irrigation system can operate on a reciprocating cycle.

It is an object to provide a novel alignment control system that can be quickly disengaged to avoid damage to it should the irrigation system malfunction.

It is an object to provide a novel alignment control system that can be quickly and easily adjusted so that adjacent pipe segments can track at any desired relative angle.

Additional objects as well as features and advantages of this invention will become evident from the descriptions set forth hereinafter when considered in conjunction with the accompanying drawings.

BRIEF DESCRIPTION OF THE DRAWINGS

FIG. 1 is an elevated view of a self-propelled, center-pivot irrigation system with which the alignment control apparatus of the present invention can be used.

FIG. 2 is a perspective view of the alignment control apparatus of the present invention in use between two adjacent pipe segments of an irrigation system.

FIG. 3 is an exploded view of the alignment control apparatus of the present invention.

FIG. 4 is an enlarged, elevated view of one end portion of the actuation arm of the control apparatus and the manner in which it is operably connected to the spool valve. The spool valve controls the flow of hydraulic fluid to the drive motor of the self-propelled support tower for one of the two adjacent pipe segments.

FIG. 5 is a perspective view of the alignment control apparatus of the present invention in use between two adjacent pipe segments of an irrigation system. FIG. 5 also illustrates the manner in which hydraulic fluid running in lines along the entire length of the distribution pipe of the irrigation system is selectively diverted by the alignment control apparatus to drive the motor of the self-propelled support tower for one of the two adjacent pipe segments. In this manner, the two adjacent pipe segments can be maintained in any predetermined alignment.

DETAILED DESCRIPTION OF THE PREFERRED EMBODIMENTS

Figure 6:
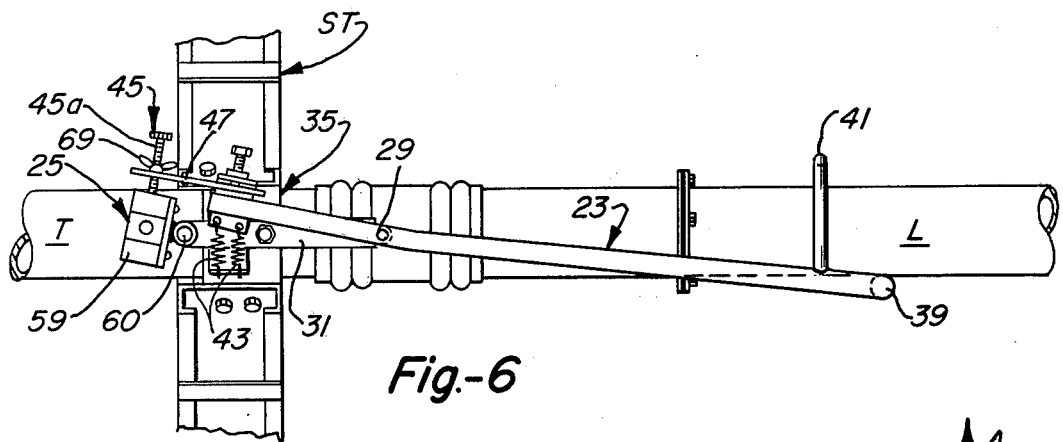
FIG. 6 is an elevated view showing the relative position of the parts of the alignment control apparatus when the adjacent pipe segments are axially aligned.

The alignment control apparatus of the present invention is designed to be used with self-propelled irrigation systems such as the center-pivot system shown in FIG. 1. It can also be used with any irrigation system in which adjacent pipe segments must be maintained in a predetermined alignment as the system moves across the field to be irrigated. Typically, irrigation systems such as the one shown in FIG. 1 have an overhead distribution pipe 1 composed of a plurality of pipe segments 3, 5, 7, and 9 supported between towers 11, 13, 15, and 17. The distribution pipe 1 extends radially outwardly of a centrally located pivot assembly 19 to which water is delivered through buried pipe 21.

In one common manner of operation of the irrigation system of FIG. 1, the drive means for the support tower 17 of the outer pipe segment 9 is set to run at a predetermined rate in the direction of arrow A. Pipe segment 9 then moves from the position shown in solid lines in FIG. 1 to the position shown in dotted lines creating an angle alpha ($\alpha$) between the adjacent pipe segments 7 and 9. For purposes of illustration, this angle is greatly exaggerated in FIG. 1. The alignment control apparatus of the present invention is then employed to detect this misalignment between adjacent pipe segments 7 and 9 and activate the drive means for the support tower 15 accordingly to bring adjacent pipe segments 7 and 9 back into alignment. As support tower 15 moves pipe segment 7 back into alignment with pipe segment 9, a misalignment is created between pipe segments 5 and 7 at support tower 13. A second alignment control apparatus is then provided between adjacent pipe segments 5 and 7 to activate the drive means for support tower 13 accordingly to bring adjacent pipe segments 5 and 7 back into alignment. This process is then repeated for pipe segments 3 and 5. In this manner, the pipe segments 3, 5, 7, and 9 move sequentially in a follow-the-leader, catchup fashion. The alignment control apparatus of the present invention can maintain the pipe segments in a relatively straight line or in almost any predetermined, crooked relationship that might be desired or dictated by the shape of the field to be irrigated.

The alignment control of the present invention is simple in design, strong, reliable, safe, sensitive to small deflections, and quickly responsive to misalignments. It operates smoothly and can track forwardly and backwardly so that the irrigation system can operate on a reciprocating cycle. Further, it can be quickly disengaged to avoid damage to it upon a malfunction and quickly and easily adjusted so that adjacent pipe segments can track at any desired relative angle.

As shown in FIGS. 2 and 3, the preferred embodiment of the alignment control apparatus of the present invention includes an elongated actuation arm 23, spool valve 25, and connecting means 27. Actuation arm 23 is pivotally mounted by pin 29 to the main support body 31 for movement about a substantially vertical axis near the connection sleeve 33 of the adjacent pipe segments T and L. First pipe segment T is the trailing segment or segment closer to the pivot assembly 19 of the pair of pipe segments T and L. Second pipe segment L refers to the leading segment in the sense that pipe segment 9 leads segment 7 and segment 7 trails segment 9 as the irrigation system moves about the pivot assembly 19. Water flows outwardly of the pivot assembly 19 through the pipe segments T and L in the direction of arrows F. Main support body 31 is mounted to the support tower ST of the trailing pipe segment T. It can be mounted directly to the pipe segment T if desired. The mounting means of members 29 and 31 mounts the actuation arm 23 with the first end portion 35 overlapping part of the trailing pipe segment T and the second end portion 37 overlapping part of the leading pipe segment L.

Figure 7:
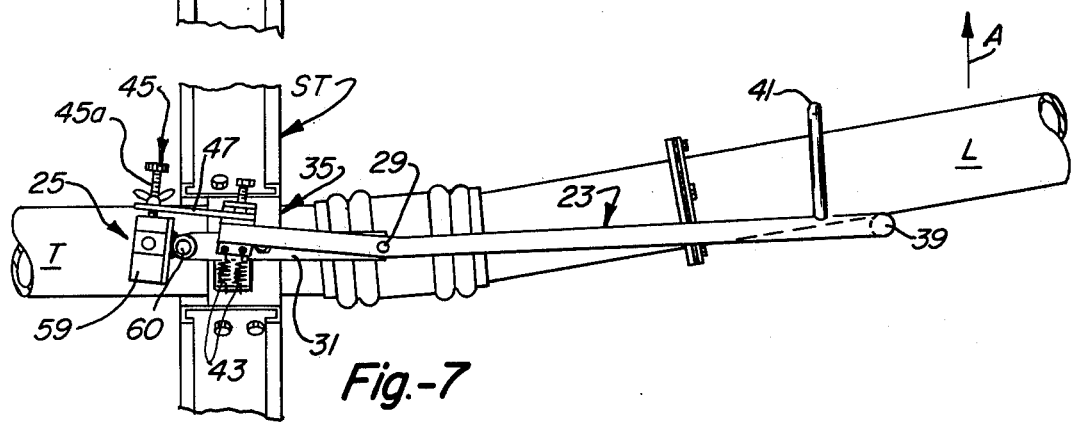
FIG. 7 is an elevated view showing the relative position of the parts of the alignment control apparatus when the leading pipe segment L moves in the direction of arrow A out of alignment with the trailing pipe segment T.
Figure 8:
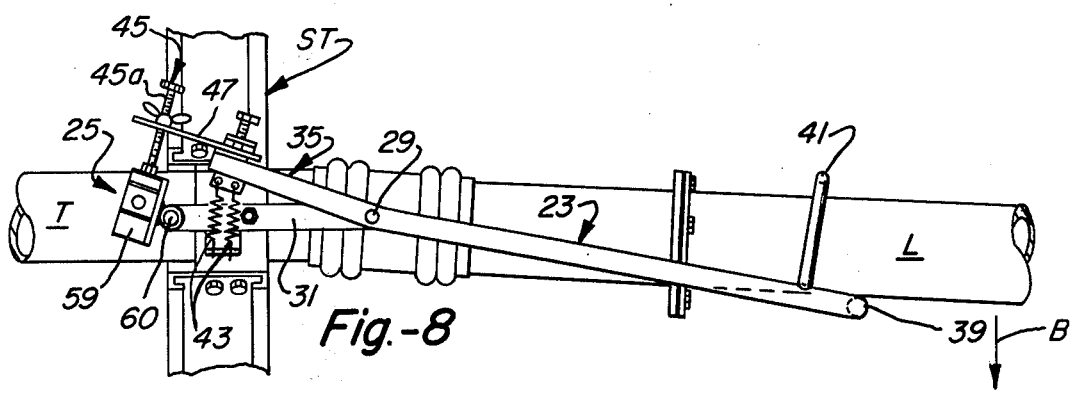
FIG. 8 is an elevated view showing the relative position of the parts of the alignment control apparatus when the leading pipe segment L moves in the direction of arrow B out of alignment with the trailing pipe segment T.

End portion 37 of the actuation arm 23 in the preferred embodiment is bifurcated into two legs 39 and 41 which vertically straddle a section of the leading pipe segment L. Springs 43 extending between the main support body 31 and the first end portion 35 of the actuation arm 23 serve to bias the leg 39 against the leading pipe segment L in a abutting relationship. In this manner, the actuation arm 23 continuously and spontaneously follows the movement of the leading pipe segment L whether it be in a forward direction relative to the trailing pipe segment T as illustrated in FIG. 7 or in a backward direction relative to the trailing pipe segment T as illustrated in FIG. 8. In the preferred embodiment, the second leg 41 is normally biased by the springs 43 in a position spaced from the leading pipe segment L. This second leg 41 serves as a backup to the biasing springs 43 should they malfunction and not maintain the first leg 39 in an abutting relationship with the leading pipe segment 41. With the biasing springs 43 malfunctioning, movement of the leading pipe segment in the direction of arrow A shown in FIG. 7 would result in the leading pipe segment L eventually striking the second leg 41 and causing the actuation arm 23 to move about its pivotal axis. This would avoid severe damage to the irrigation system and alignment control apparatus should the springs 43 malfunction. The alignment control apparatus is much more responsive to misalignments and direction reversals of the irrigation system than when the springs 43 are not connected.

As best illustrated in FIG. 4, the first end portion 35 of the actuation arm 23 is releasably secured to the threaded portion 45a of control member 45 of the spool valve 25 by plate member 47, U-shaped member 49 which is secured to the first end portion 35 of the actuation arm 23, and screw 51. To protect the spool valve 25 from damage during towing of the irrigation system between locations or in the event of any emergency, the actuation arm 23 and spool valve 25 can be quickly and easily disconnected from each other by unscrewing screw 51 and pivoting plate member 47 about the control member 45 out of the U-shaped member 49. To reconnect the actuation arm and spool valve 25, the procedure is reversed.

The spool valve 25 itself is of known construction and an example of such a valve is made by Brand Hydraulics, 2332 South 15th Street, Omaha, Nebraska 68105. Basically, hydraulic fluid runs along the distribution pipe 1 as illustrated in FIG. 5 in out and return lines 55 and 57 with lines 55a and 57a running to each respective spool valve 25. Valve control member 45 has a first portion (not shown) mounted within the valve housing 59 for movement relative thereto along an axis. The valve housing 59 is pivotally mounted by pin 60 to the main support body 31 for movement about a substantially vertical axis. The control member 45 has a neutral position in which the first portion within the valve housing 59 passes no hydraulic fluid through line 61 or 63 to the drive motor 65 of the support tower ST and the support tower ST is still. When the control member 45 moves away from this neutral position in a first direction, hydraulic fluid is diverted through line 61 to drive motor 65 and back to the spool valve 25 through line 63. This serves to rotate the drive motor 65 in a first direction. When the control member 45 is moved away from the neutral position in a second direction opposite from the first, the spool valve 25 diverts hydraulic fluid through line 63 to the drive motor 65 and back through line 61 to the spool valve 15. This serves to rotate the motor 65 in a second direction opposite to the first. In the preferred embodiment, the threaded portion of 45a of the control member 45 is mounted to the first portion in axial alignment therewith by a lost motion connection so that rotation of the threaded portion 45a does not move it axially relative to the first portion. Plate 47 of the connecting means 27 has a threaded hole 67 therethrough mating with the threads of portion 45a. By rotating portion 45a of the control member 45, plate member 47 can be moved to any desired position therealong moving the first end portion 35 of the actuation arm 23 with it. The wing nut 69 in FIG. 4 is used to help maintain the plate member 47 at the preferred location along the threaded portion 45a of the control member 45. In this manner, the plate member 47 of the connecting means 27 between the actuation arm 23 in the valve control member 45 is adjustable along the control member 45 to vary the position of the actuation arm 23 relative to the neutral position of the control member 45. Thus, the alignment control apparatus of the present invention can be set to maintain the adjacent pipe segments T and L at any desired angle relative to each other.

In operation as illustrated in FIGS. 6–8, pipe segments T and L are first aligned relative to each other as desired. This can be done by manually pushing or pulling the control member 45 of the spool valve relative to the valve housing 59 to activate the drive motor for the support tower ST. Gross, initial adjustments are preferably made with the plate member 47 of the connecting means 27 released from securement within the U-shaped member 49. Fine adjustments can be made without releasing plate member 47 if desired. When plate member 47 is removed from securement within the U-shaped member 49, springs 43 bias leg 39 of the actuation arm 23 against the leading pipe segment L. With the valve control member 45 in its neutral position and the adjacent pipe segments T and L in the desired relationship (as for example, axially aligned in FIG. 6), wing nut 69 can be loosened from engagement with the plate member 47 if it is not already so loosened. Threaded portion 45a is then turned to move plate member 47 axially therealong until it can be swung into the U-shaped member 49. In the position of FIG. 6, the pipe segments T and L are in the alignment that is to be maintained by the alignment control apparatus of the present invention. Springs 43 are biasing leg 39 of the actuation arm against pipe segment L, actuation arm 23 is connected to the control member 45 of the spool valve 25, and the control member 45 is in its neutral position.

Should the leading pipe segment L move in the direction of arrow A as shown in FIG. 7, springs 43 will maintain leg 39 of the actuation arm 23 against pipe segment L and cause the actuation arm 23 to pivot about its vertical axis as defined by pin 29. This causes the first end portion 35 of the actuation arm 23 to move about the pivot pin 29 relative to the pipe segment T and the valve control member 45 to move inwardly of valve housing 59 by virtue of plate member 47 of the connecting means 27 between the first end portion 35 and the valve control member 45. As illustrated in FIG. 7, the valve housing 59 is mounted to the main support body 31 for pivotal movement about the pin 60 to prevent binding of the valve control member 45 as it is moved relative to the valve housing 59. Referring to FIG. 8, should the leading pipe segment L move in the direction of arrow B, leading pipe segment L pushes directly against leg 39 of the actuation arm 23 against the force of the biasing springs 43. This pivots the actuation arm 23 about the pivot pin 29 and moves the first end portion 35 so that the valve control member 45 is moved outwardly of the valve housing 59. As is the case in FIG. 7, the valve housing 59 pivots about the pin 60 in order to prevent binding of the valve control member 45 within the valve housing 59 as it moves outwardly thereof.

A spool valve is preferably used with the alignment control apparatus of the present invention; however, any valve which has a neutral position and can be mounted to accommodate the movement of the first end portion 35 of the actuation arm 23 can be used. Further, although the alignment control apparatus of the present invention is shown in use with a center-pivot, irrigation system, it can be used with any system in which adjacent pipe segments or elements must be maintained in a predetermined alignment as the system moves. The elongated actuation arm 23 is shown to have a slight bend in it adjacent the pivot pin 29. This arm can be straight if desired, however, it is preferred that the pivot pins 60 and 29 are parallel to each other and substantially intersect the axis of the trailing pipe segment T. Further, the spring members 43 can be any means that will supply a biasing force and the second leg 41 of the bifurcated end portion 37 of the actuation 23 can be eliminated if a backup for the biasing means 43 is felt to be unnecessary. The biasing means can be located anywhere along the actuation arm 23 as long as it biases one of the legs 39, 41 (preferably 39) against the leading pipe segment L. If desired, a biasing means could extend between the actuation arm 23 and the leading pipe segment L.

While several embodiments of the present invention have been described in detail herein, various changes and modifications can be made without departing from the scope of the invention.

I claim:

1. In a self-propelled irrigation system having a distribution pipe composed of at least first and second pipe segments movably mounted to each other in fluid communication and having at least one self-propelled tower supporting each pipe segment in a substantially horizontal position for movement relative to the other pipe segment, an alignment control apparatus for selectively operating said self-propelled support tower for said first pipe segment to maintain said first pipe segment in a predetermined alignment with said second pipe segment, said controlled apparatus comprising:

an elongated actuation arm having first and second end portions, means for mounting said arm adjacent said first and second pipe segments with said first end portion overlapping part of said first pipe segment and said second end portion overlapping part of second pipe segment, said mounting means including a main support body, means for mounting said main body in a fixed position relative to said first pipe segment, and means for pivotably mounting said actuation arm to said main body between the end portions of said arm for movement about a substantially vertical, pivotal axis, said mounting means further including means operably connected between said arm and said first pipe segment for biasing a part of second end portion of said arm against said second pipe segment in an abutting relationship whereby said second end portion of said arm moves with said second pipe segment to pivot said arm about said pivotal axis and move said first end portion of said arm relative to said first pipe segment, said second end portion being movable against the force of said biasing means away from said abutting relationship with said second pipe segment, spool valve means for controlling the movement of the self-propelled support tower for said first pipe segment, said spool valve means including a housing, means for mounting said housing adjacent said first pipe segment, a control member elongated along a first axis, and means for mounting a first portion of said valve control member for longitudinal movement within said valve housing along a second axis coincident with said first axis, said valve control member further having a second portion spaced along said first axis from said first portion, said valve control member having a neutral position within said housing in which said self-propelled supporting tower for said first pipe segment is still, and, means operably connected between said first end portion of said arm and said second portion of said valve control member for moving said control member with said first end portion of said arm, said connecting means including a first member and means for selectively securing said first member to said second portion of said valve control member at any desired location along said first axis whereby the portion of said first member and said arm relative to the neutral position of said valve control member can be selectively adjusted, and, said connecting means further including means for releasably securing said first member to said first end portion of said arm whereby said first end portion and said valve control member can be quickly and easily disconnected from each other.

2. The control apparatus of claim 1 wherein said second end portion of said actuation arm is bifurcated into two legs vertically straddling a section of said second pipe segment, said straddled section having an outer diameter and said legs being horizontally spaced from each other a distance slightly greater than said outer diameter, said part of said second end portion of said arm biased by said biasing means against said second pipe segment comprising one leg and said biasing means normally biasing said second leg in a position spaced from said second pipe segment whereby said second leg serves as a backup to said biasing means should said biasing means malfunction in that movement of said second pipe segment in a direction away from said one leg with said biasing means malfunctioning will cause the second pipe segment to strike and move the second leg moving said arm about said pivotal axis and said valve control member relative to said valve housing, 3. The control apparatus of claim 1 wherein said mounting means for said valve housing includes means for pivotally mounting said valve housing adjacent said first pipe segment for movement about a substantially vertical axis.

4. The control apparatus of claim 1 wherein said second portion of said valve control member is threaded and said first member of said connecting means has a threaded hole therethrough for receiving said second portion of said valve control member, said releasable securing means of said connecting means being operable to secure said first member against movement relative to said actuation arm whereby said first member can be positioned at any desired location along said second portion of said valve control member by turning said second portion of said valve control member about said first axis.

5. The control apparatus of claim 1 wherein said first member of said connecting means is a plate and said releasable securing means includes a substantially U-shaped member and a screw member, said first member having an end portion receivable within said U-shaped member and said U-shaped member having a threaded hole therethrough for receiving said screw member whereby said end portion of said first member can be positioned within said U-shaped member and said screw member advanced toward the interior of said U-shaped member to secure the end portion of said first member therein.

6. In a self-propelled irrigation system having a distribution pipe composed of at least first and second pipe segments movably mounted to each other in fluid communication and having at least one self-propelled tower supporting each pipe segment in a substantially horizontal position for movement relative to the other pipe segment, an alignment control apparatus for selectively operating at least one of said self-propelled support towers to maintain said first and second pipe segments in a predetermined alignment, said controlled apparatus comprising:

an elongated actuation arm having first and second end portions, means for mounting said arm adjacent said first and second pipe segments with said first end portion overlapping part of said first pipe segment and said second end portion overlapping part of second pipe segment, said mounting means including a main support body, means for mounting said main body in a fixed position relative to said first pipe segment, and means for pivotably mounting said actuation arm to said main body between the end portions of said arm for movement about a substantially vertical, pivotal axis, said mounting means further including means operably connected between said arm and at least one of said first and second pipe segments for biasing a part of said second end portion of said arm against said second pipe segment in an abutting relationship whereby said second end portion of said arm moves with said second pipe segment to pivot said arm about said pivotal axis and move said first end portion of said arm relative to said first pipe segment, said second end portion being movable against the force of said biasing means away from said abutting relationship with said second pipe segment, valve means for controlling the movement of the self-propelled support tower for said first pipe segment, said valve means including a housing, means for mounting said housing adjacent at least one of said first and second pipe segments, a control member, and means for mounting said control member for movement relative to said valve housing, and, means operably connected between said one end portion of said arm and the control member of said valve means for moving said control member with said one end portion of said arm.

7. The control apparatus of claim 6 wherein said second end portion of said actuation arm is bifurcated into two legs vertically straddling a section of said second pipe segment, said straddled section having an outer diameter and said legs being horizontally spaced from each other a distance slightly greater than said outer diameter, said part of said second end portion of said arm biased by said biasing means against said second pipe segment comprising one leg and said biasing means normally biasing said second leg in a position spaced from said second pipe segment whereby said second leg serves as a backup to said biasing means should said biasing means malfunction in that movement of said second pipe segment in a direction away from said one leg with said biasing means malfunctioning will cause the second pipe segment to strike and move the second leg moving said arm about said pivotal axis and said valve control member relative to said valve housing.

8. The control apparatus of claim 6 wherein said valve means is a spool valve and said valve control member is elongated along a first axis, said mounting means for said valve control member mounting a portion of said valve control member for longitudinal movement within said valve housing along a second axis coincident with said first axis.

9. The control apparatus of claim 8 wherein said mounting means for said valve housing includes means for pivotally mounting said valve housing adjacent said at least one of said first and second pipe segments for movement about a substantially vertical axis.

10. The control apparatus of claim 8 wherein said valve control member has a neutral position within said housing in which said self-propelled supporting tower for said first pipe segment is still, said valve control member further having a second portion spaced along said first axis from said first portion, and, said connecting means between said one end portion of said arm and said valve control member includes a first member and means for selectively securing said first member to said second portion of said valve control member at any desired location along said first axis whereby the position of said first member and said arm relative to the neutral position of said valve control member can be selectively adjusted.

11. The control apparatus of claim 10 wherein said second portion of said valve control member is threaded and said first member of said connecting means has a threaded hole therethrough for receiving said second portion of said valve control member whereby said first member can be positioned at any desired location along said second portion of said valve control member by turning said second portion of said valve control member about said first axis.

12. The control apparatus of claim 11 wherein said connecting means further includes means for releasably securing said first member to at least one of said valve control member and said one end portion of said arm whereby said one end portion and said valve control member can be quickly and easily disconnected from each other.

13. The control apparatus of claim 12 wherein said first member is a plate and said releasable securing means includes a substantially U-shaped member and a screw member, said first member having an end portion receivable within said U-shaped member and said U-shaped member having a threaded hole therethrough for receiving said screw member whereby said end portion of said first member can be positioned within said U-shaped member and said screw member advanced toward the interior of said U-shaped member to secure the end portion of said first member therein.

14. The control apparatus of claim 6 wherein said mounting means for said valve housing includes means for pivotally mounting said valve housing adjacent said at least one of said first and second pipe segments for movement about a substantially vertical axis.

15. The control apparatus of claim 6 wherein said valve control member has a first portion extending along a first axis and a second portion spaced along said first axis from said first portion, said valve control member having a neutral position within said housing in which said self propelled supporting tower for said first pipe segment is still, said mounting means for said valve control member mounting said first portion of said valve control member for longitudinal movement within said valve housing along a second axis coincident with said first axis, and, said connecting means between said one end portion of said arm and said valve control member includes a first member and means for selectively securing said first member to said second portion of said valve control member at any desired location along said first axis whereby the position of said first member and said arm relative to the neutral position of said valve control member can be selectively adjusted.

16. The control apparatus of claim 15 wherein said second portion of said valve control member is threaded and said first member of said connecting means has a threaded hole therethrough for receiving said second portion of said valve control member whereby said first member can be positioned at any desired location along said second portion of said valve control member by turning said second portion of said valve control member about said first axis.

17. The valve control apparatus of claim 6 wherein said connecting means between said one end portion of said arm and said valve control member includes a first member and means for releasably securing said first member to at least one of said valve control member and said one end portion of said arm whereby said one end portion and said valve control member can be quickly and easily disconnected from each other.

18. The control apparatus of claim 17 wherein said releasable securing means includes a substantially U-shaped member and a screw member, said first member of said connecting means having an end portion receivable within said U-shaped member and said U-shaped member having a threaded hole therethrough for receiving said screw member whereby said end portion of said first member can be positioned within said U-shaped member and said screw member advanced toward the interior of said U-shaped member to secure the end portion of said first member therein.

* * * * *